UNITED STATES PATENT OFFICE.

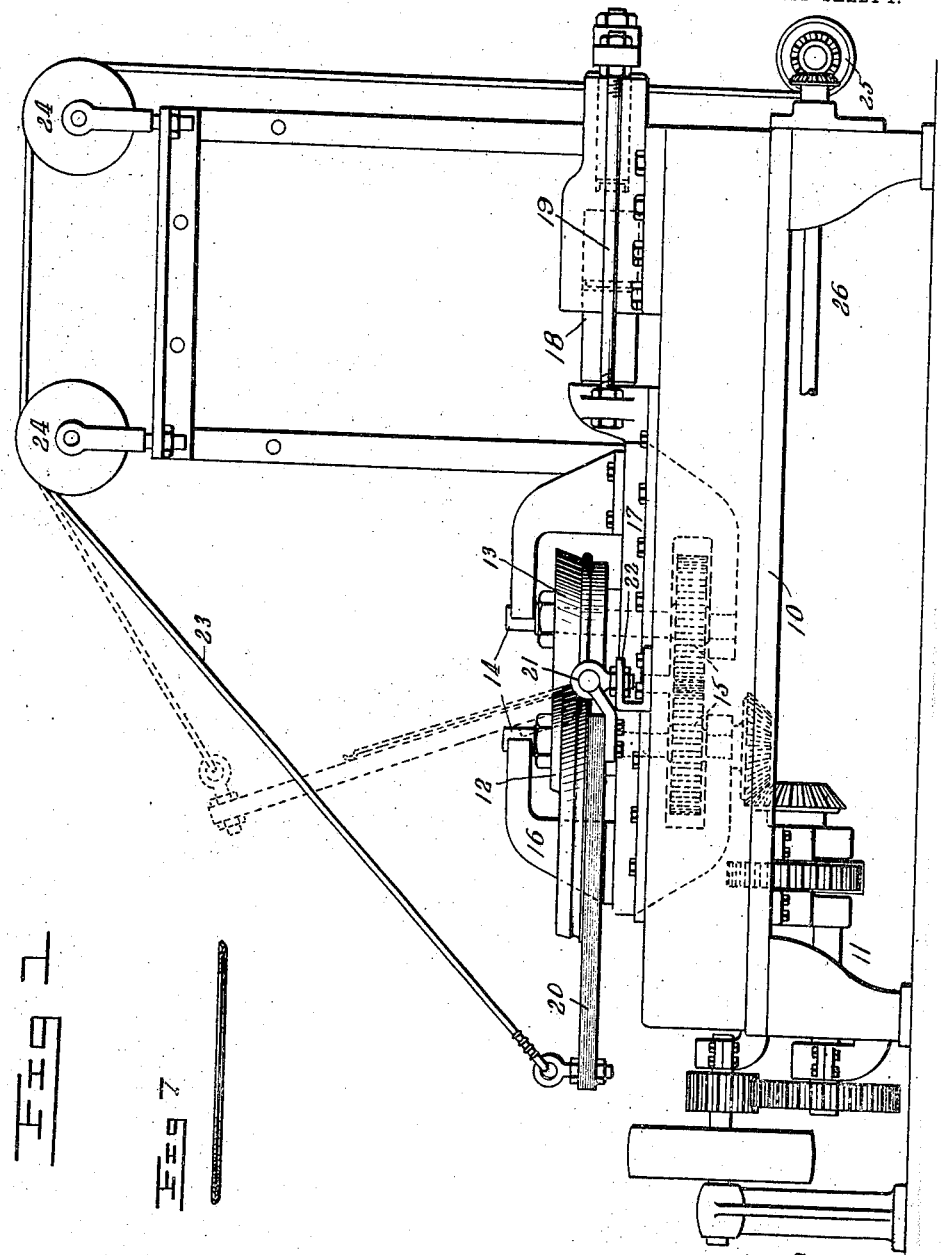

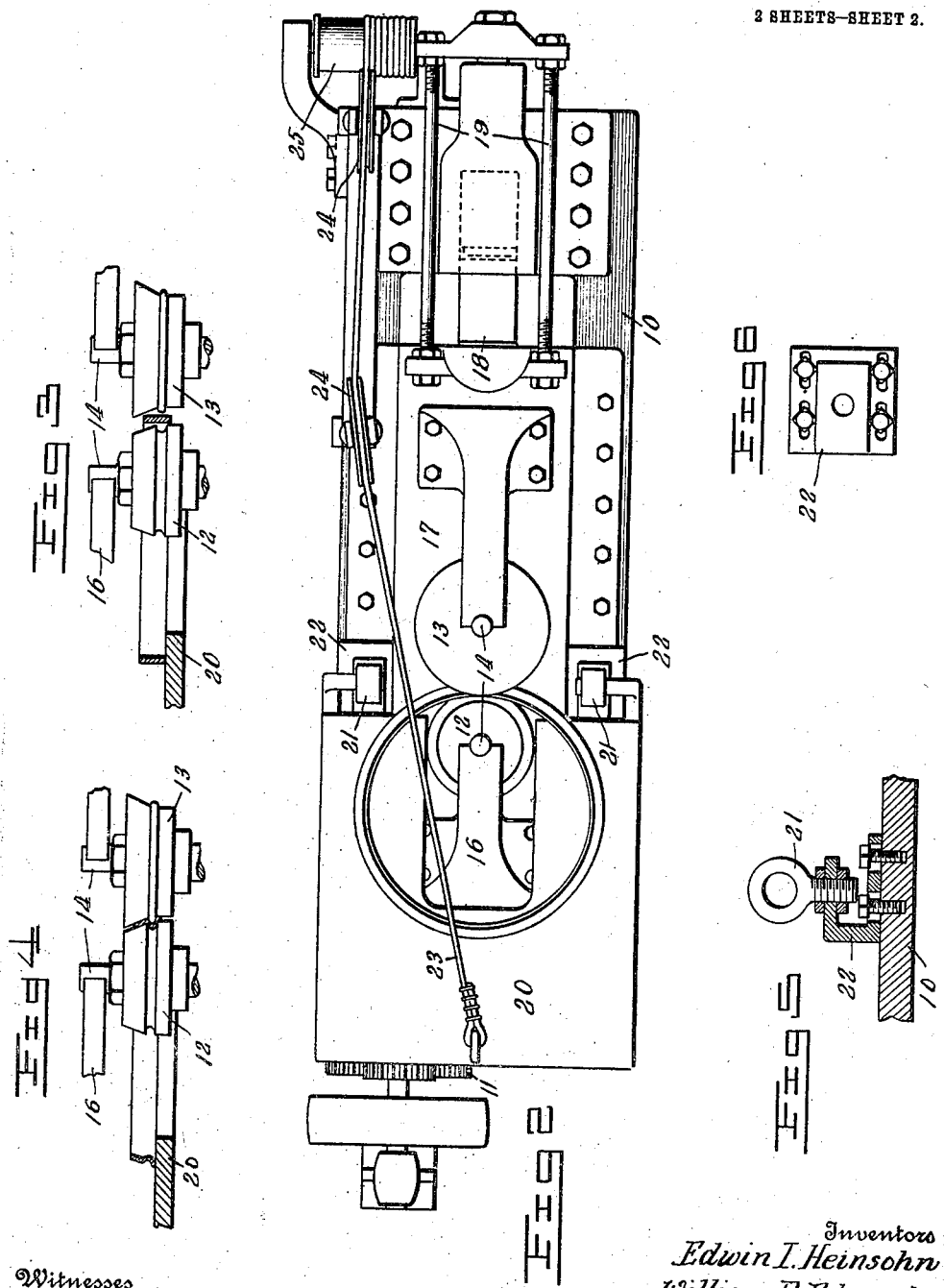

EDWIN I. HEINSOHN, WILLIAM R. EDWARDS, AND FREDERICK R. KLAUS, OF CLEVELAND, OHIO, ASSIGNORS TO THE CLEVELAND WELDING & MFG. CO., OF CLEVELAND, OHIO, A CORPORATION OF OHIO.

MACHINE FOR ROLLING ANNULAR PLATES.

1,041,279. Specification of Letters Patent. Patented Oct. 15, 1912.

Application filed November 8, 1911. Serial No. 659,225.

*To all whom it may concern:*

Be it known that we, EDWIN I. HEINSOHN, WILLIAM R. EDWARDS, and FREDERICK R. KLAUS, citizens of the United States, residing at Cleveland, in the county of Cuyahoga and State of Ohio, have invented new and useful Improvements in Machines for Rolling Annular Plates, of which the following is a specification.

The present invention relates to a machine for rolling annular plates, and particularly annular clencher plates such as are used in connection with automobile tires, especially of the solid type, and it is in connection with this particular type of plate that this disclosure is made, although it will be understood that the apparatus may be adapted to the forming of annular plates for other purposes.

The invention has for its object to provide an expeditious and economical method of and machine for rolling from the stock, which is in the form of an endless band, preferably of the desired contour in cross section, the beaded annular plates which are used to engage the locking projections or recesses on the tire by their bead portions, and provide the necessary inner peripheral web which abuts the felly of the wheel and through which the securing bolts or rivets pass.

The object aimed at is accomplished by providing means, as a pair of rolls, between which the band of stock is driven and held at one point in the circumference of the band and during such revolution of the stock, moving it from the plane in which it lies initially, toward a plane at right-angles to the plane of its initial revolution.

In order that the invention may be clear to those skilled in the art we have illustrated in the accompanying drawings one embodiment of our invention, although it will be understood that this showing is merely illustrative and not restrictive of the invention, which may be worked out in other ways and by equivalent mechanical devices.

In the drawings, Figure 1 is a side view of a machine embodying our invention. Fig. 2 is a plan view of the machine shown in Fig. 1. Fig. 3 is a view somewhat diagrammatic to show the adaptation of the machine to plain stock. Fig. 4 is a detail showing in cross section the appearance of the band as the latter is operated upon by the rolls, and before the band support is turned or swung upwardly from its original position. Fig. 5 is a detail showing in cross section one of the adjustable bearings upon which the band support is journaled. Fig. 6 is a plan view of an adjustable pedestal forming a part of each bearing. Fig. 7 is a detail showing in cross section a specimen of the completed article made by our apparatus.

Referring to the drawings by numerals, like numbers indicating like parts in the several views, 10 denotes any suitable machine bed having a power shaft and drive pulleys which deliver to any suitable gear box 11 to give such speed as may be desired to the rolls 12 and 13, which rolls are carried by spindles 14, the roll 12 being directly driven while the roll 13 is in gear therewith between suitable gears 15 (see dotted lines, Fig. 1), so as to give it uniform peripheral speed and proper direction of rotation.

The roll 12 is mounted on a fixed portion of the bed 10, a suitable yoke 16 being provided for the upper end of the spindle. The roll 13 is similarly mounted and carried by a movable slide 17 traversing suitable ways in the machine bed, the movements of the slide 17 being effected by means of a hydraulic jack or plunger 18 of any suitable type and provided with the usual feed and reverse controlling devices, the reversing head of this jack 18 being connected by suitable thrust rods 19 with the slide 17. Hinged to the bed 10 and in alinement with the bite of the rolls 12 and 13, is a stock-supporting table 20, the arms of the table straddling the roll 12, as shown, and being pivoted to suitable eyes 21 adjustably mounted in standards carried by an adjustable-supporting block 22 secured to the bed of the machine. This table, as will be seen from Fig. 1, may be swung from the full-line position to the dotted-line position through the medium of a suitable hoist, and though any type of table-elevating device may be utilized, we have found a simple and efficient one to be a cable 23, running from an eye at the end of the table 20 over pulleys 24, carried by suitable uprights and thence to a winding drum 25 secured at the end of the machine bed, said winding drum being driven by a counter shaft 26, connected in any suitable manner with the main power shaft and provided with clutching and unclutching devices, so that the drum may be thrown into and out of operation as is customary in winding drums.

With a machine constructed as described, its operation and the method of forming the annular plates is as follows: The roll 13 having been retracted by means of the hydraulic jack, the stock, which in the form shown is an endless hoop or band, is dropped between the rolls, whereupon the roll 13 is brought up to close position and grips the band. The power being then thrown on, the band will be revolved between the gripping rolls, and the winding drum being started, the table 20 will be gradually moved toward a plane at right angles to the initial plane of revolution of the hoop. The result of these two movements of the band is to roll it at the point where it is gripped in the rolls from the band-like form of the stock to the annular ring of the finished product, the operation being rapid and effected without deterioration of the material.

It will be understood, of course, that the shape of the rolls can be varied at will according to the cross section of the plate to be rolled, these rolls being preferably removable from their spindles so that different sets of rolls may be employed on the same machine.

As will be readily understood from the foregoing description, the band resting upon the band carrier is at all times parallel with the same, and as the band carrier is swung angularly upward, as indicated by dotted lines in Fig. 1, the band is angularly moved toward a plane coinciding substantially with a cross section through said band at the point where said band is gripped by the rolls.

As hereinbefore stated and as shown in Fig. 6, 1 and 2 of the drawings, the stock from which the plate is formed is preferably shaped in cross section with the beads, ribs, or such other projections as may be desirable before it is subjected to the rolling operation described to flatten it into an annular plate and while this is preferable it is not absolutely essential as the stock may, in some cases, particularly where the material being worked is light, be beaded or ribbed in this same machine prior to the flattening operation. It will be obvious that under these conditions a plain, unbeaded band, as shown in Fig. 3, would be placed between the forming rolls and revolved between them until brought to the desired formation in cross-section, after which rolling operation the table would be swung to effect the flattening of the band to the ring form, as hereinbefore described.

We claim:—

1. Apparatus for forming annular plates, comprising a pair of rolls having operating surfaces of proper width for engaging the full width of a band as measured in a direction parallel with the general axis thereof, so as to turn said band peripherally, and means for moving said band toward a plane extending in the general direction of said full width of the band when thus engaged by said rolls.

2. Apparatus for forming annular plates, comprising a pair of rolls provided with operating surfaces of proper width to engage the full width of a band as measured in a direction parallel with the general axis of said band, a supporting member for guiding said band relatively to said rolls, and means for normally holding said supporting member in a predetermined plane oblique to the general direction of the grip of the rolls in order to expand one edge of said band and contract another edge thereof, said supporting member being also movable toward a plane extending in the general direction of the width of the portion of the band where the latter is engaged by said rolls.

3. Apparatus for forming annular plates comprising a pair of rolls provided with operating surfaces of proper width to engage the full width of a band as measured in a direction substantially parallel with the general axis thereof, a supporting member disposed adjacent to said rolls for guiding said band relatively to the latter, means for normally maintaining said supporting member in such position relatively to said rolls that the general plane of said band is oblique relatively to the general direction of the grip of the rolls, and mechanism for gradually turning said supporting member toward a plane parallel with the axes of said rolls.

4. Apparatus for forming annular plates comprising a pair of rolls provided with operating surfaces of proper width to engage the full width of a band as measured in a direction substantially parallel with the general axis of said band, a supporting table disposed adjacent to said rolls, means for normally maintaining said supporting table in a predetermined plane slightly oblique relatively to the general direction of the grip of the rolls, and means for turning said table in a direction crossing said predetermined plane.

In testimony whereof we have hereunto set our hands in presence of two subscribing witnesses.

EDWIN I. HEINSOHN.
WILLIAM R. EDWARDS.
FREDERICK R. KLAUS.

Witnesses:
  PEARL D. COLLINS,
  M. BARTLETT.